US 8,214,359 B1

(12) United States Patent
Gomes et al.

(10) Patent No.: US 8,214,359 B1
(45) Date of Patent: *Jul. 3, 2012

(54) DETECTING QUERY-SPECIFIC DUPLICATE DOCUMENTS

(75) Inventors: Benedict A. Gomes, Mountain View, CA (US); Benjamin T. Smith, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/839,164

(22) Filed: Jul. 19, 2010

Related U.S. Application Data

(63) Continuation of application No. 10/602,965, filed on Jun. 24, 2003, now Pat. No. 7,779,002, which is a continuation of application No. 09/684,542, filed on Oct. 6, 2000, now Pat. No. 6,615,209.

(60) Provisional application No. 60/184,126, filed on Feb. 22, 2000.

(51) Int. Cl.
*G06F 7/00* (2006.01)

(52) U.S. Cl. ........ 707/728; 707/692; 707/721; 707/737; 707/748

(58) Field of Classification Search .................. 707/692, 707/721, 728, 737, 748
See application file for complete search history.

(56) References Cited

U.S. PATENT DOCUMENTS

| 5,222,234 A * | 6/1993 | Wang et al. .................... 717/163 |
| 5,469,354 A | 11/1995 | Hatakeyama et al. |
| 5,634,051 A | 5/1997 | Thomson |
| 5,721,897 A | 2/1998 | Rubinstein |
| 5,794,233 A | 8/1998 | Rubinstein |
| 5,913,215 A | 6/1999 | Rubinstein et al. |
| 5,940,842 A | 8/1999 | Sakuta |
| 5,987,460 A | 11/1999 | Niwa et al. |
| 6,081,805 A * | 6/2000 | Guha ..................... 707/999.002 |
| 6,327,590 B1 * | 12/2001 | Chidlovskii et al. .......... 707/734 |
| 6,526,400 B1 | 2/2003 | Takata et al. |
| 6,547,829 B1 | 4/2003 | Meyerzon et al. |
| 2002/0046203 A1 * | 4/2002 | Siegel et al. ..................... 707/1 |

FOREIGN PATENT DOCUMENTS

GB 2335761 A 9/1999

OTHER PUBLICATIONS

Sergey Brin and Lawrence Page, "The Anatomy of a Large-Scale Hypertextual Web Search Engine," Proc. 7th International WWW Conference, Brisbane, Australia, 1998, 20 pages.
Andrei Z. Broder. Steven C. Glassman, Mark S. Manasse and Geoffrey Zweig, "Syntactic Clustering of the Web," Proc. 6th International WWW Conference (1997) [online], retrieved from the Internet: http://decweb.ethz.chIWWW6rrechnicallPaper205.html, pp. 1-14.
Susan Feldman, "NLP Meets the Jabberwocky: Natural Language Processing in Information Retrieval," [online], Natural Language Processing in Information Retrieval, (May 1999), pp. 1-14.

(Continued)

*Primary Examiner* — Cheyne Ly
(74) *Attorney, Agent, or Firm* — Fish & Richardson P.C.

(57) ABSTRACT

An improved duplicate detection technique that uses query-relevant information to limit the portion(s) of documents to be compared for similarity is described. Before comparing two documents for similarity, the content of these documents may be condensed based on the query. In one embodiment, query-relevant information or text (also referred to as "snippets") is extracted from the documents and only the extracted snippets, rather than the entire documents, are compared for purposes of determining similarity.

41 Claims, 11 Drawing Sheets

OTHER PUBLICATIONS

Oren Zamir and Oren Etzioni, "Computer Networks: The International Journal of Computer and Telecommunications Networking," vol. 31, Issue 11-16 (May 1999), pp. 1361-1374.

Oren Eli Zamir, "Clustering Web Documents: A Phrase-Based Method for Group Search Engine Results," University of Washington, 1999, 208 pages.

* cited by examiner

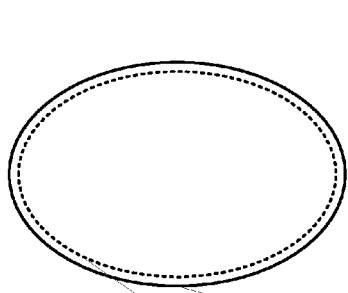
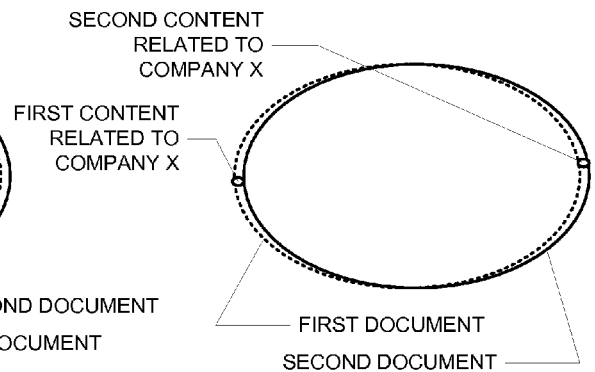
FIGURE 1  FIGURE 2
FIGURE 3  FIGURE 4
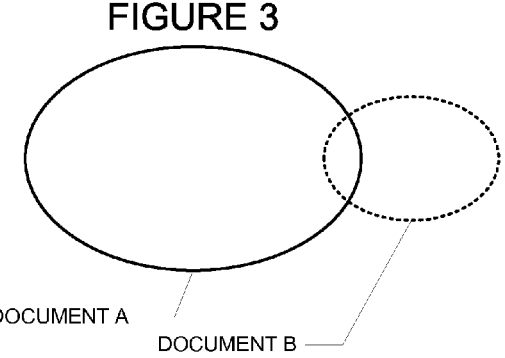
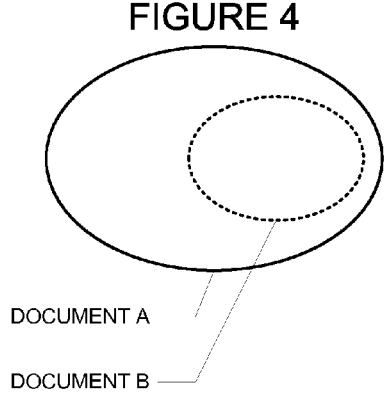
FIGURE 5  FIGURE 6
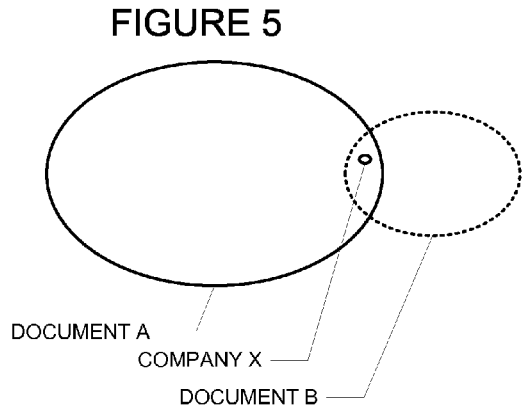
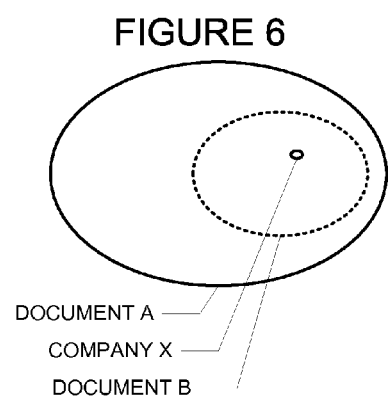

700

DETECTING QUERY-SPECIFIC DUPLICATE DOCUMENTS

CROSS-REFERENCE TO RELATED APPLICATIONS

This application is a continuation application of and claims priority to U.S. patent application Ser. No. 10/602,965, titled "Detecting Query-Specific Duplicate Documents," filed Jun. 24, 2003, which is a continuation of U.S. patent application Ser. No. 09/684,542, titled "Detecting Query-Specific Duplicate Documents," filed Oct. 6, 2000, now U.S. Pat. No. 6,615,209, which claims the benefit under 35 U.S.C. §119(e)(1), of U.S. Patent Application Ser. No. 60/184,126, titled "Method and Apparatus for Detecting Query-Specific Duplicate Documents," filed on Feb. 22, 2000, all of which are incorporated herein by reference.

§1. BACKGROUND OF THE INVENTION

§1.1 Field of the Invention

The present invention concerns information retrieval in general. More specifically, the present invention concerns detecting and/or removing duplicate information or duplicate content in response to, and based on, an information search query.

§1.2 Related Art

§1.2.1 The Migration from Data Entry, Manipulation and Storage, to Information Access The ways in which people use computing machines has evolved over the last 50 or so years. The proliferation of networks, along with the increased availability of inexpensive data storage means, has afforded computer users unprecedented access to a wealth of content. Such content may be presented to a user (or "rendered") in the form of text, images, audio, video, etc.

Although people continue to use computers to enter, manipulate and store information, in view of the foregoing developments, people are using computers (or more generally, information access machines) to access information to an ever increasing extent. Unfortunately, however, the very vastness of available information which has attracted many users, can overwhelm users. Consequently, desired information can become difficult to find.

§1.2.2 Known Techniques for Finding Desired Information

Various techniques have been employed to help users locate desired information. In the context of the Internet for example, some services have organized content based on a hierarchy of categories. A user may then navigate through a series of hierarchical menus to find content that may be of interest to them. An example of such a service is the YAHOO™ web site on the Internet.

Again in the context of the Internet for example, some services provide "search engines" which search content or "web sites" pursuant to a user query. In response to a user's query, a rank ordered list, which typically includes brief descriptions of the content, as well as hyper-text links (i.e., text, having associated URLs) to the content is returned. The rank ordering of the list is typically based on a degree of match between words appearing in the query and words appearing in the content.

§1.2.2.1 Automated Indexing and its Perceived Shortcomings

Most search engines perform three main functions: (i) crawling the World Wide Web; (ii) indexing the content of the World Wide Web; and (iii) responding to a search query using the index to generate search results. The crawl operation collects web pages. The indexing operation associates document(s) (e.g., web page(s)) with words or phrases, and also creates an inverted index which associates words or phrases with documents. The search operation then (i) uses that inverted index to find documents (e.g., web pages) containing various words of a search query, and (ii) ranks or orders the documents found in accordance with some heuristic(s). Given the large amount of information available, these three main functions are automated to a large extent.

Although it is believed that automating the indexing operation is the only way to make searching a large amount of diverse material feasible, automating indexing operations introduces some challenges. More specifically, one of the problems of automated indexing is that the World Wide Web may include the same information duplicated in different forms or at different places on the World Wide Web. For example, some content is "mirrored" at different sites on the World Wide Web. Such mirroring is used to alleviate potential delays when many users attempt to request the same information at the same time, and/or to minimize network latency (e.g., by caching web pages locally). Some content will have plain text and HTML (hyper-text markup language) versions so that users can render or download the content in a form that they prefer. Finally, some web pages aggregate or incorporate content available from another source on the World Wide Web.

When users submit a query to a search engine, most users do not want links to (and descriptions of) web pages that have duplicate information. For example, search engines typically respond to search queries by providing groups of ten results. If pages with duplicate content were returned, many of the results in one group may include the same content. Thus, there is a need for a technique to avoid providing search results to web pages having duplicate content.

Some duplicate avoidance techniques are effected during the automated indexing operation. Similar documents can be flagged by (i) defining a similarity measure between two documents, and (ii) defining the two documents as "duplicates" if the similarity measure exceeds a predetermined threshold.

Unfortunately, however, often duplicate information may be found in documents that are not exactly the same or even very similar. For example: (i) identical content may be presented with different formatting (e.g., plain text versus HTML); (ii) different headers and/or footers may be prepended and/or appended, respectively, to identical content; (iii) hit counters may be appended to identical content; (iv) last modified dates may be appended, to identical content; and (v) one web site may include a copy of content found elsewhere (e.g., as a part of a compilation or aggregation of content, or simply as an insertion). Cases (ii)-(iv) are illustrated by the Venn diagrams of FIGS. 1 and 2. FIG. 1 illustrates the case where a second document merely adds a small amount of information (e.g., a counter, a footer, etc.) to a first document, whereas FIG. 2 illustrates the case where a second document slightly changes some information (e.g., a last modified date) of a first document. The present invention may be used to detect such "duplicates" with slight changes.

Furthermore, the present invention may be used to detect duplicate content within documents that have a lot of different information, such as documents with different formatting codes or documents that aggregate or incorporate other content. Many prior techniques are not well-suited for such cases. For example, assume that documents A and B each contain basic financial information about companies. Assume further that document A has information on 50 companies, while document B has information on 100 companies, at least some of which are the same as those in document A. (For example, document B could be a later, expanded version of document A.) The Venn diagrams of FIGS. 3 and 4 illustrate such examples.

Many known document similarity techniques would not consider documents A and B to be very similar even though they may contain a lot of identical content. A user searching for information about the 50 companies included in document A, however, would likely become frustrated if a search engine provides links not only to document A, but also to other documents (e.g., document B) that contain the same information about the 50 companies. The articles, A. Broder et al, "Syntactic Clustering of the Web," *Proc. 6th International WWW Conference* (1997), A. Broder et al, "Filtering Near-Duplicate Documents," *FUN'* 98 and A. Broder et al, "On the Resemblance and Containment of Documents," *SEQUENCES'* 98, pp. 21-29 (hereafter referred to as "the Broder articles") describe a method (hereafter referred to as "the Broder method") for detecting duplicate documents. The Broder method may be used to find documents that are "roughly the same" and "roughly contained" in each other. More specifically, for each pair of documents, the Broder method generates a number that indicates the extent to which the documents appear to be related. A threshold is then used to determine whether or not the two documents are related enough (or similar enough) to be declared "duplicates". The Broder method, however, does not consider the specific information that a user is looking for in its analysis.

In view of the foregoing, there is a need for an improved duplicate detection technique. Such a technique should be automated so that processing a large amount of content from a large number of sources is feasible.

§2. SUMMARY OF THE INVENTION

The present invention provides an improved duplicate detection technique that uses query-relevant information to limit the portion(s) of documents to be compared for similarity. In other words, before comparing two documents for similarity, the content of these documents may be condensed based on the query. In one embodiment, query-relevant part(s) (also referred to as "snippets" in one embodiment) are extracted from the documents and only the extracted query-relevant part(s), rather than the entire documents, are compared for purposes of determining similarity.

As can be appreciated by the foregoing summary, an improved duplicate detection technique under the present invention is preferably performed after indexing, during the processing of a particular search query. However, in systems in which at least some indexing is performed after receiving (or processing) a query, the present invention may be performed before such indexing.

By limiting the portion(s) of the documents being compared, a large range of duplicate document types, including those that would be missed by conventional similarity determination techniques, will be detected. Further, since only a portion(s) of the documents are compared, the similarity threshold can be set relatively higher, thereby decreasing the number of documents that would be falsely identified as duplicates if a lower threshold were used.

In the example set forth above, further assume that the documents A and B included identical information about company X (See the Venn diagrams in FIGS. 5 and 6.), and that a user submitted a query about company X. In accordance with the present invention, documents A and B would be considered duplicates with respect to a query about company X. Referring to FIG. 5, even prior art methods that can determine containment would probably conclude that document B is not "contained" in document A, notwithstanding the fact that both are similar (or even the same) with respect to company X. Referring to FIG. 2, assume that both the first and second documents contain information about company X, albeit different information. The query-specific method of the present invention may find that the two documents are not similar (with respect to company X). On the other hand, most, if not all, known techniques would find these documents similar since such techniques do not consider query-relevant information in their analysis.

Note that aside from documents that match each other exactly, whether or not documents are duplicates is somewhat subjective and application specific. Although the term "duplicates" should be broadly interpreted, it should be understood that one goal of the present invention may be, in the context of a search engine for example, to avoid annoying users with different versions of information that add little or no value to the user once one of the versions is interpreted by the user.

§3. BRIEF DESCRIPTION OF THE DRAWINGS

FIG. 1 is a Venn diagram of a second document that includes the contents of a first document and a small amount of additional information.

FIG. 2 is a Venn diagram of first and second documents with a lot of identical content, but each having some content not found in the other.

FIG. 3 is a Venn diagram of first and second documents with some identical content in common.

FIG. 4 is a Venn diagram of first document which includes the contents of a second document, as well as an appreciable amount of additional information.

FIG. 5 is a Venn diagram of first and second documents with some identical content in common, such identical content including information about company X.

FIG. 6 is a Venn diagram of first document which includes the contents of a second document, as well as an appreciable amount of additional information, where the second document, and therefore the first document, includes information about company X.

§4. DETAILED DESCRIPTION

The present invention involves novel methods, apparatus and data structures for identifying duplicate documents based, at least in part, on a query. In the following, the term "documents" should be interpreted broadly to include content such as web pages, text files, etc. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as the following disclosed methods, apparatus, articles of manufacturer, and data structures and any other patentable subject matter to the extent that they are patentable.

In the following, an environment in which the present invention may be employed is introduced in §4.1. Then, functions that may be performed by the present invention are introduced in §4.2. Then, processes, data structures, methods and apparatus that may be used to effect those functions are described in §4.3. Thereafter, an example of how an exemplary system of the present invention may operate is described in §4.4. Finally, some conclusions about the present invention are set forth in §4.5.

§4.1 Exemplary Environment in which Invention may Operate

The following exemplary embodiment is presented to illustrate an example of utility of the present invention and to illustrate an example of a context in which the present invention may operate. However, the present invention can be used in other environments and its use is not intended to be limited to the exemplary environment 700 and search facility 800 introduced below with reference to FIGS. 7 and 8, respectively.

Figure 7:
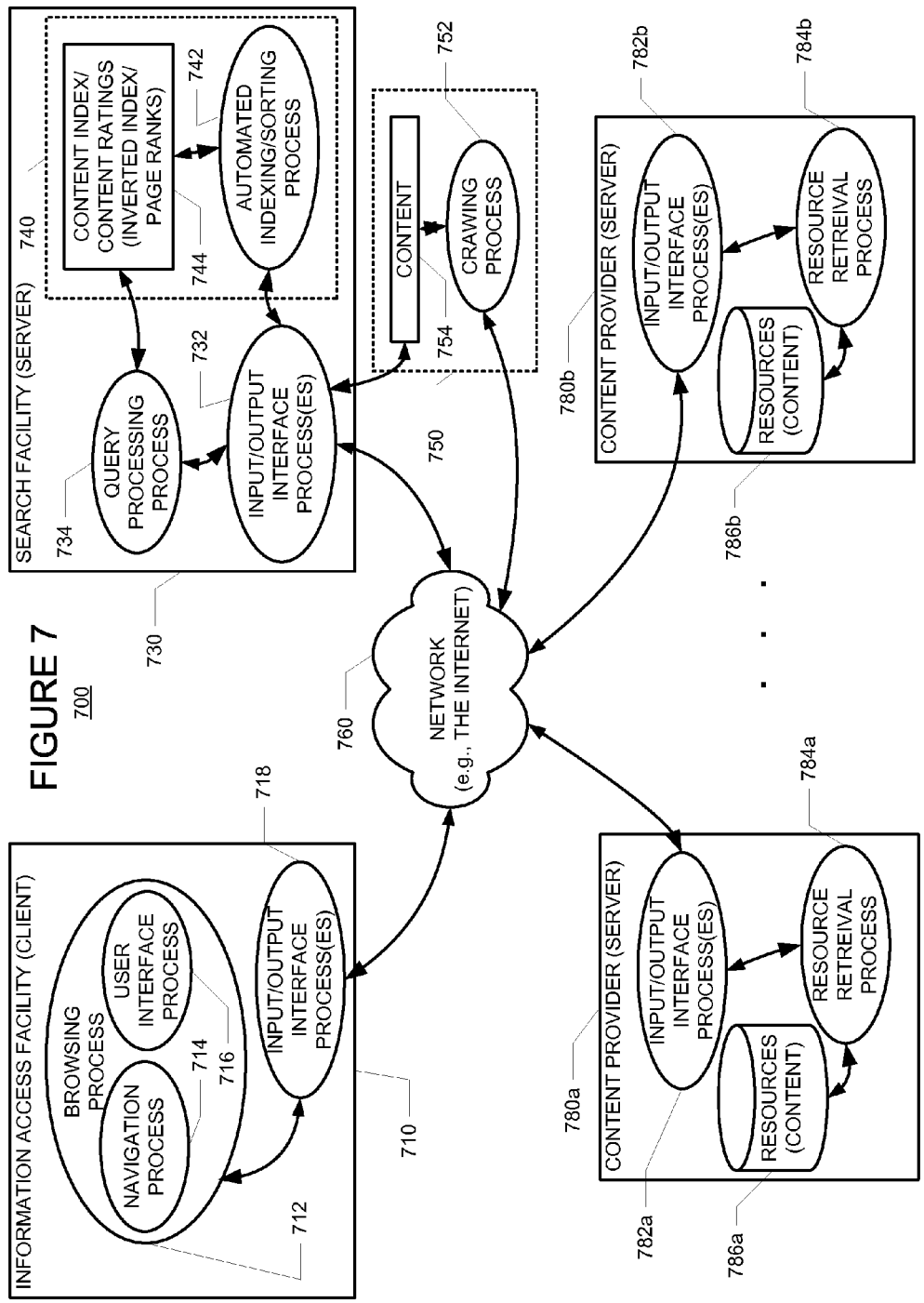
FIG. 7 is a high-level block diagram of an environment in which at least some aspects of the present invention may be used.

FIG. 7 is a high-level block diagram of an environment 700 in which at least some aspects of the present invention may be used. This environment 700 may be a network (such as the Internet for example) 760 in which an information access facility (client) 710 is used to render information accessed from one or more content providers (servers) 780. A search facility (server) 730 may be used by the information access facility 710 to search for content of interest.

The information access facility 710 may include a browsing process 712 which may include a navigation process 714 and a user interface process 716. The browsing process may access the network 760 via input/output interface processes 718. For example, in the context of a personal computer, the browsing process 712 may be a browser (such as "Internet Explorer" from Microsoft Corporation of Redmond, Wash. or "Netscape Navigator" from Netscape Communications, of Mountain View, Calif.) and the input/output interface processes may include a modem or network interface card (or NIC) and networking software. Other examples of possible information access facilities 710 include untethered devices, such as personal digital assistants and mobile telephones for example, set top boxes, kiosks, etc.

Each of the content providers 780 may include stored resources (also referred to as content) 786, a resource retrieval process 784 that accesses and provides content in response to a request, and input/output interface process(es) 782. These processes of the content providers 780 may be effected by computers, such as personal computers or servers for example. Accordingly, the stored resources 786 may be embodied as data stored on some type of storage medium such as a magnetic disk(s), an optical disk(s), etc. The term "document" should be interpreted to include addressable content, such as a web page for example.

The search facility 730 may perform crawling, indexing/sorting, and query processing functions. These functions may be performed by the same entity or separate entities. Further, these functions may be performed at the same location or at different locations. In any event, at a crawling facility 750, a crawling process 752 gets content from various sources accessible via the network 760, and stores such content, or a form of such content, as indicated by 754. Then, at an automated indexing/sorting facility 740, an automated indexing/sorting process 742 may access the stored content 754 and may generate a content index (e.g., an inverted index, to be described below) and content rankings (e.g., PageRanks, to be described below) 740. Finally, a query processing process 734 accepts queries and returns query results based on the content index (and the content rankings) 740. The crawling, indexing/sorting and query processing functions may be performed by one or more computers.

Figure 8:
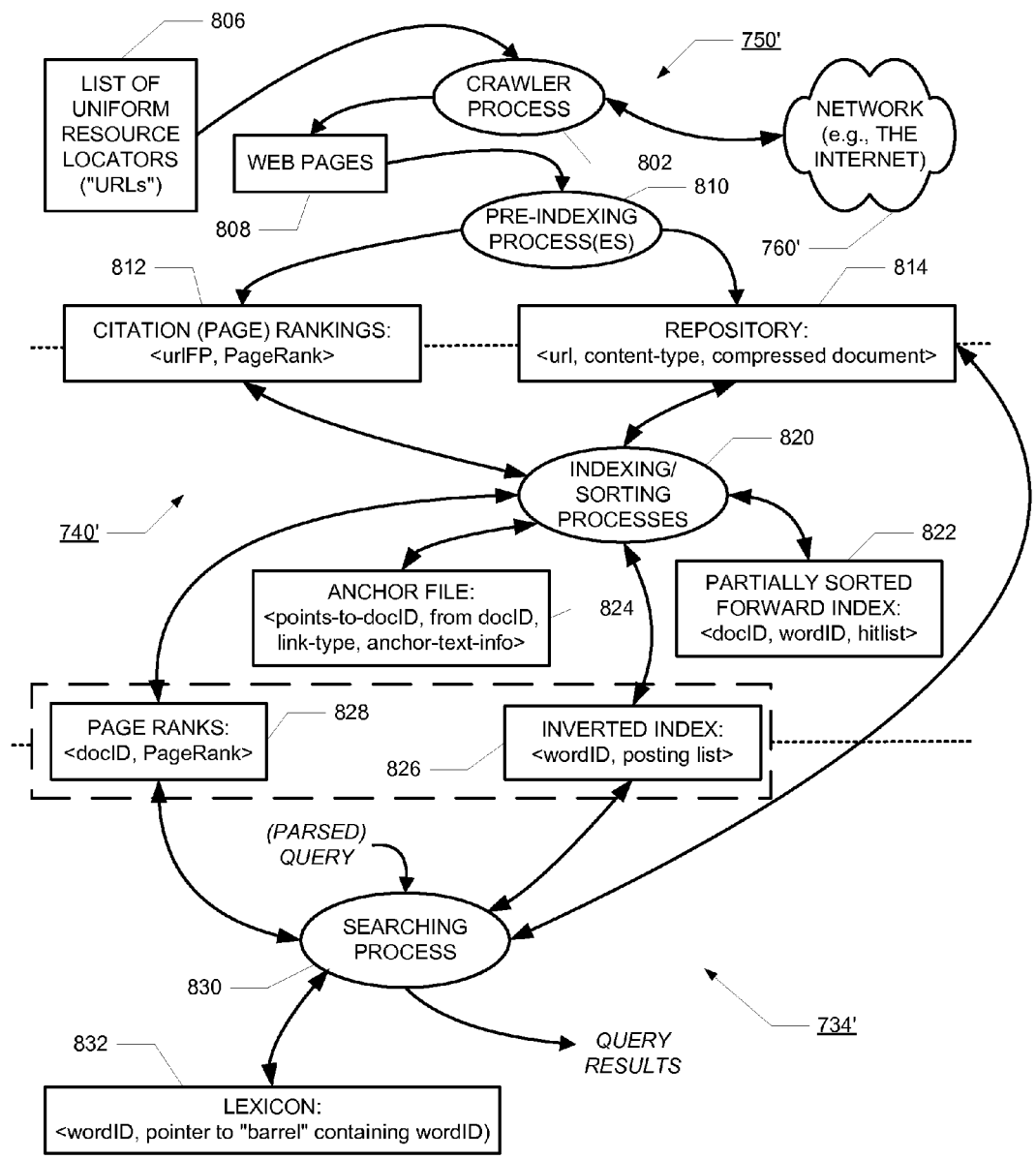
FIG. 8 is a process bubble diagram of an advanced search facility in which at least some aspects of the present invention may be used.

Although the present invention may be used with a number of different types of search engines, the present inventors anticipate that it will be used with an advanced search facility, such as the one presently available from Google, Inc. of Mountain View, Calif. FIG. 8 is a process bubble diagram of such an advanced search facility 800 in which at least some aspects of the present invention may be used.

The advanced search facility 800 illustrated in FIG. 8 performs three main functions: (i) crawling; (ii) indexing/sorting; and (iii) searching. The horizontal dashed lines divide FIG. 8 into three parts corresponding to these three main functions. More specifically, the first part 750' corresponds to the crawling function, the second part 740' corresponds to the indexing/sorting function, and the third part 734' corresponds to the search (or query processing) function. (Note that an apostrophe "'" following a reference number is used to indicate that the referenced item is merely one example of the item referenced by the number without an apostrophe.) Each of these parts is introduced in more detail below. Before doing so, however, a few distinguishing features of this advanced search facility 800 are introduced.

The advanced search facility uses the link structure of the World Wide Web to improve search results. In particular, the search facility uses a page rank algorithm to rank the importance of each web page. An exemplary page rank algorithm is described in the article S. Brin and L. Page, "The Anatomy of a Large-Scale Hypertextual Search Engine," *Seventh International World Wide Web Conference*, Brisbane, Australia. The search facility may also use other techniques to improve the quality of search results, such as: using anchor text information for a web page; maintaining location information for all hits (so proximity in search may be used); tracking some visual presentation details such as font size of words (so that words in a larger or bolder font may be weighted higher than other words); and maintaining a repository storing the full raw HTML (or other code) of pages. As will become apparent in the following description, the present invention may exploit this repository.

Referring back to FIG. 8, the three main parts of the advanced search engine 800 are now described further.

The crawling part 750' may be distributed across a number of machines. A single URL server (not shown) serves lists of uniform resource locations ("URLs") 806 to a number of crawlers. Based on this list of URLs 806, the crawling process 802 crawls the network 760' and gets web pages 808. A pre-indexing process 810 may then generate page rankings 812, as well as a repository 814 from these web pages 808. The page rankings 812 may include a number of URL fingerprint (i.e., a unique value), PageRank value (as introduced above) pairs. The repository 814 may include URL, content type and compressed page triples.

Regarding the indexing/sorting part 740', the indexing/sorting process 820 may generate a partially sorted forward index 822 from the repository 814. More specifically, this process 820 may decompress each document in the repository 814 and parse it. After each document is parsed, it may then be encoded into the partially sorted forward index 820 by: (i) converting every word into a wordID by using an in-memory hash table—the lexicon; and (ii) translating occurrences of words in the current document into hit lists. To generate the inverted index 826, the indexing/sorting process 820 may then sort the partially sorted forward index 822 by wordID. The indexing/sorting process 820 may also generate page ranks 828 from the citation rankings 812. The page ranks 828 may include document ID, PageRank value pairs.

Regarding the query processing part 734', the searching processes 830 may be run by a web server and may use a lexicon 832, together with the inverted index 826 and the PageRanks 828 to generate query results in response to a query. The query results may be based on a combination of (i) information derived from PageRanks 828 and (ii) information derived from how closely a particular document matches the terms contained in the query (also referred to as the information retrieval (or "IR") component). Having described exemplary environments in which the present invention may be used, functions that may be performed by the present invention are now introduced in §4.2 below.

§4.2 Functions which may be Performed by the Present Invention

At a high level, the present invention may function to detect "duplicate" documents (e.g., web pages). The present invention may do so by using query-relevant information to limit the portion(s) of documents to be compared for similarity. In other words, before comparing two documents for similarity, the content of these documents may be condensed based on the query.

Thus, the present invention may further function to "condense" the content of documents based on the query. The present invention may do so by extracting query-relevant information or text (also referred to as "snippets") from the documents. In such a case, only the extracted snippets, rather than the entire documents, are compared for purposes of determining similarity.

Having introduced functions that may be performed by the present invention, exemplary processes, data structures, methods and apparatus for effecting these functions are described in §4.3 below.

§4.3 Exemplary Processes, Data Structures, Methods and Apparatus for Effecting Functions that may be Performed by the Present Invention In the following, exemplary processes that may be performed by the present invention, and exemplary data structures that may be used by the present invention, are introduced in §4.3.1 with reference to FIG. 9. Then, exemplary methods for removing duplicates is described in §4.3.1.1 with reference to FIGS. 10 through 12. Finally, exemplary apparatus that may be used to effect the exemplary processes and store the exemplary data structures are described in §4.3.2 with reference to FIG. 13.

§4.3.1 Exemplary Processes and Data Structures

Figure 9:
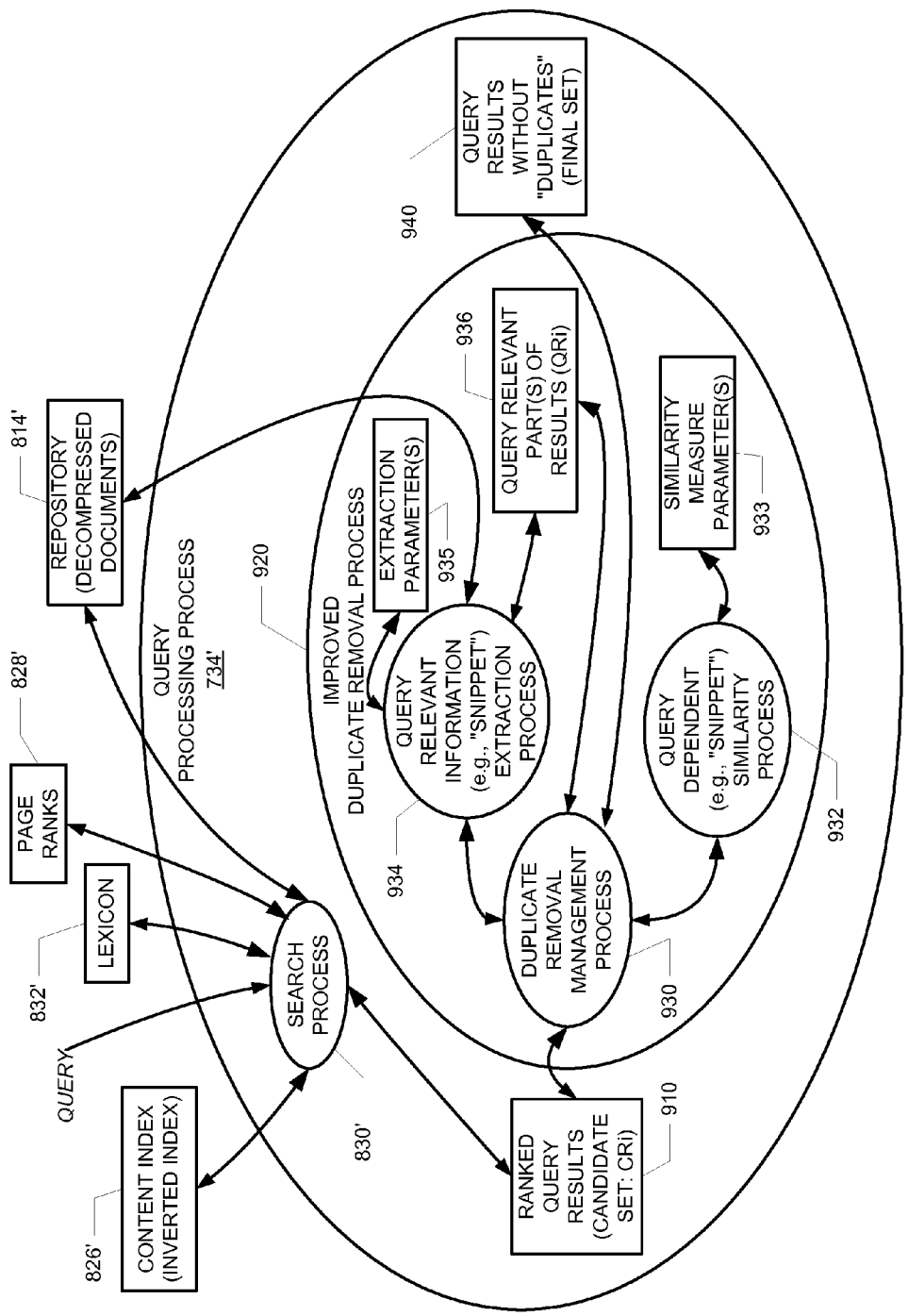
FIG. 9 is a process bubble diagram which illustrates some functions that may be performed by the present invention.

FIG. 9 is a process bubble diagram that illustrates some functions that may be performed by the present invention. Basically, a query processing process 734' may include a search process 830' and an improved duplicate removal process 920. The search process 830' generates rank-ordered query results 910 in response to a query. Assuming, for example, the search process 830' is an advanced searching facility such as the one employed by Google, Inc. of Mountain View, Calif. and introduced in §4.1 above, the search process 830' may use a content index (an inverted index) 826', page ranks 828', a lexicon 832' and a repository 814' to generate the rank-ordered query results 910. In such a case, exemplary data structures of the inverted index 826', the page ranks 828', the lexicon 832' and the repository 814' may be the same as those introduced in §4.1 above. However, the improved duplicate removal process is not limited for use in such a system and can be used in other, alternative, systems.

The rank-ordered query results 910 define a set of candidate results CR corresponding to a number of documents, from which the improved duplicate removal process 920 generates a set of final query results 940 by removing "duplicate" documents. To reiterate, the improved duplicate removal process 920 detects duplicate documents (e.g., web pages) by using query-relevant information to limit the portion(s) of documents to be compared for similarity. Duplicate documents are then removed (or, more accurately, not added to the final set 940).

At a high level, in the improved duplicate removal process 920, a duplicate removal management process 930 uses a query-relevant information (e.g., "snippet") extraction process 934 to extract query-relevant information from documents. This information is referred to as query-relevant part(s) of the results 936. As used below, "the query-relevant part(s)" term is to be interpreted broadly to include some or all query-relevant parts of a document unless specified otherwise. The query-relevant part(s) of an $i^{th}$ document are denoted, collectively, as $QR_i$. The query-relevant information extraction process 934 may operate based on tunable extraction parameter(s) 935 and may accept documents from the repository 814' (or decompressed documents from an intervening source). The duplicate removal management process 930 then uses a query-dependent information (e.g., snippet) similarity process 932 to determine whether or not a candidate document is "similar" to a document already in the final set 940. This similarity determination is based on the query-relevant part(s) 936 of the documents under consideration, and may consider tunable similarity measure parameter(s) 933. Thus, the query-relevant information similarity process 932 is performed on limited portion(s) of documents (the query-relevant part(s) of the results), rather than being performed on the entire documents.

Having introduced data structures that may be used by, and processes that may be performed by, the present invention, an exemplary duplicate removal method is described in §4.3.1.1 below with reference to FIG. 10. Exemplary query-relevant information extraction methods are then described in §4.3.1.1.1 below with reference to FIGS. 11 and 12. Exemplary query-relevant information similarity determination methods are then described in §4.3.1.1.2 below. Finally, exemplary apparatus that may be used to effect these processes and store these data structures are described in §4.3.2 below.

§4.3.1.1 Exemplary Duplicate Removal Method

Briefly stated, the improved duplicate removal process 930 extracts, starting with the highest-ranked candidate result $CR_1$, the query-relevant part(s) of the document corresponding to the candidate result, thereby generating a set of one or more query-relevant part(s) (or "snippets") associated with the original document $QR_i$ for each original candidate result $CR_i$. Then, the process 930 adds the most relevant result $CR_2$ to the final result set 940. For each of the remaining candidate results $CR_2$ through $CR_{last}$, the query-relevant part(s) $QR_i$ of the corresponding ($i^{th}$) document is compared with the query-relevant part(s) of any of the proceeding documents, $QR_1$ through $QR_{i-1}$, that were added to the final result set, to determine whether the query-relevant part(s) are so similar as to conclude that the documents to which they correspond are "duplicates".

Comparing the query-relevant part(s) of the current document $QR_i$ with the query-relevant part(s) of only those documents in the final set avoids duplicate removal due to "transitive" similarity. That is, suppose $QR_1$ is similar to $QR_2$, $QR_2$ is similar to $QR_3$, but $QR_1$ is not similar to $QR_3$. If the query-relevant part(s) of the current document were compared with the query-relevant part(s) of all preceding documents, the final set would only include $CR_1$, rather than $CR_1$ and $CR_3$.

Once the query relevant-part(s) $QR_i$ of a given $i^{th}$ document is found to be a duplicate of query-relevant part(s) associated with any preceding document in the final set 940, no further comparisons are needed—the candidate result CR associated with the document will not be added to the final set 940. Stated differently, a candidate result is added to the final set 940 only if the query-relevant part(s) $QR_i$ of its corresponding document is not found to be similar to the query-relevant part(s) of any and all other documents preceding it, $QR_1$ through $QR_{i-1}$, and found in the final results set 940.

Figure 10:
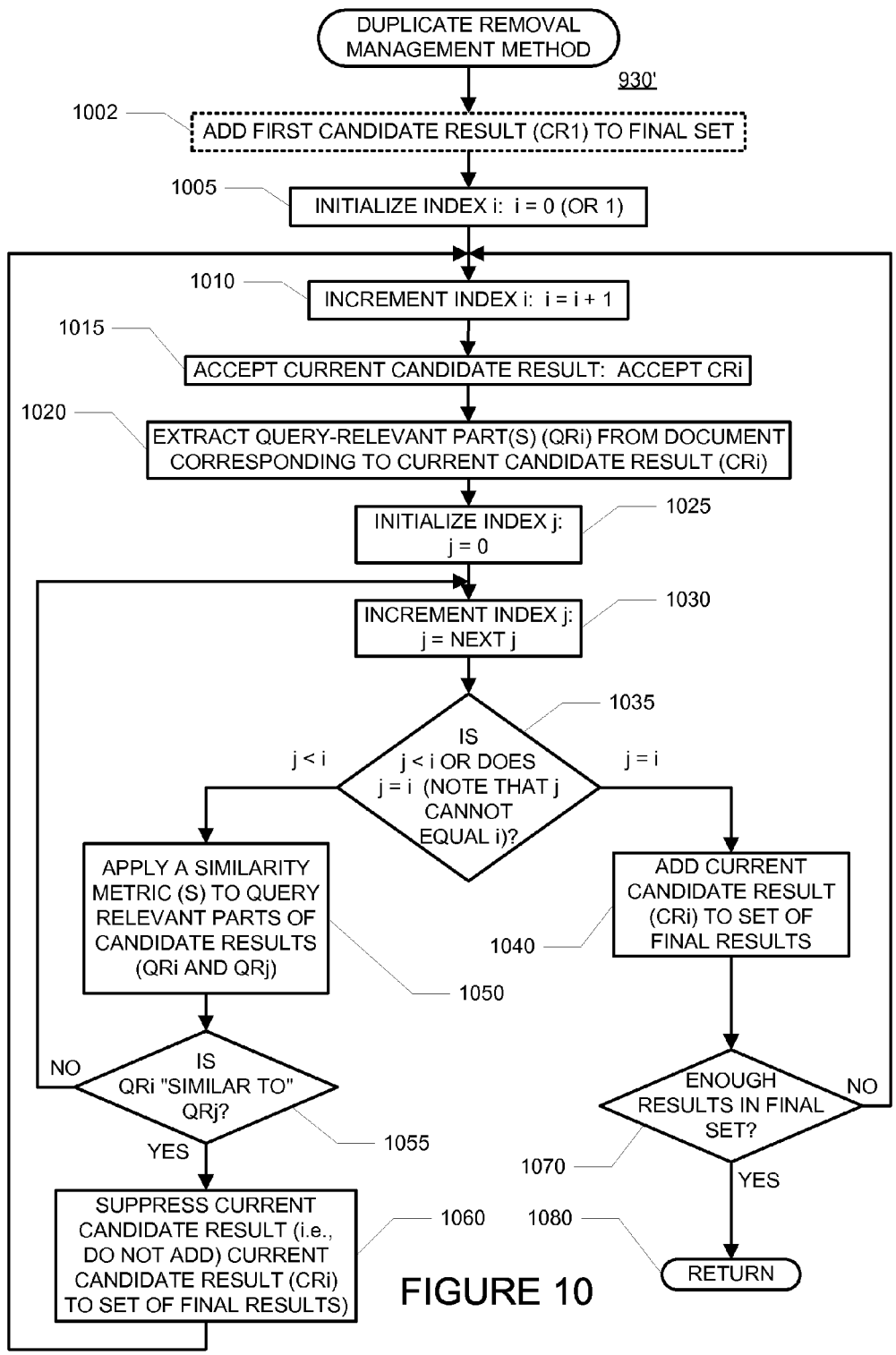
FIG. 10 is a high level flow diagram of an exemplary method that may be used to effect a duplicate removal management process.

FIG. 10 is a high level flow diagram of an exemplary duplicate removal management method 930' which may be used to effect the process 930. An index "i" is initialized and incremented as shown in blocks 1005 and 1010, respectively. The $i^{th}$ candidate result $CR_i$ is then accepted, and the query-relevant part(s) $QR_i$ of its corresponding document are extracted, as indicated by blocks 1015 and 1020. This extraction act 1020 corresponds to the query-relevant extraction process 934.

A second index "j" is initialized and a next index j is determined (Recall that only the query-relevant part(s) of those documents already in the final set are used.) as shown in blocks 1025 and 1030, respectively. At decision branch point 1035, it is determined whether the second index j is less than the first index i, or whether the second index j is equal to the first index i. If the former is true, a similarity metric is applied to the query-relevant part(s) $QR_i$ and $QR_j$ of the documents corresponding to candidate results $CR_i$ and $CR_j$. Then at decision branch point 1055, it is determined whether or not the query-relevant part(s) $QR_i$ and $QR_j$ are similar. If not, the method 930 branches back to block 1030. If, on the other hand, the query-relevant part(s) $QR_i$ and $QR_j$ are similar, then the current candidate result $CR_i$ is suppressed (that is, the current candidate result is not added to the final set) as shown in block 1060, and the method 930' branches back to block 1010 to try a next candidate result $CR_{i+1}$.

Referring once again to decision branch point 1035, if the first index i is equal to the second index j (which will occur when the query-relevant part(s) $QR_i$ were not found to be similar to any of the query-relevant part(s) associated with the preceding candidate documents ($QR_1$ through $QR_{i-1}$) that are in the final set 940, then the candidate result $CR_i$ is added to the set of final results 940 as indicated by block 1040, and the method 930' proceeds to decision branch point 1070.

At decision branch point 1070, it is determined whether or not there are enough results in the final set. If not, the method 930' branches back to block 1010 to test the next candidate result $CR_{i+1}$. Otherwise, if there are enough results in the final set, the method 930' is left via RETURN node 1080. The final set may be incrementally updated in groups of a predetermined number (e.g., ten) of results, where a next group of results is determined only if the user requests more results.

Actually, since the first candidate result $CR_1$ has the highest rank and is kept even if the query-relevant part(s) $QR_1$ of its corresponding document are similar to the query-relevant part(s) of any other document, it should be simply added to the set of final results 940 before block 1010 or 1005 as indicated by block 1002 depicted with dashed lines. In this case, the index i would be initialized to 1 in step 1005. Further, although the query-relevant part(s) of each document corresponding to each candidate result were determined as needed (Recall block 1020.), the query-relevant part(s) $QR_1$ through $QR_{last}$ for all of the documents corresponding to all of the candidate results could be determined up-front.

Referring back to block 1020, query-relevant part(s) $QR_i$ of the document corresponding to the current candidate result $CR_i$ are extracted. Section 4.3.1.1.1 below describes exemplary methods for performing this act. Further, referring back to blocks 1050 and 1055, a similarity metric is applied to the query-relevant part(s) $QR_j$ of a document corresponding to a present candidate result and a document corresponding to a previous candidate result $QR_j$. Section 4.3.1.1.2 below describes exemplary methods for performing this act.

§4.3.1.1.1 Exemplary Query-Relevant Information Extraction Methods

Many alternative methods may be used to extract query-relevant part(s) QR from a document corresponding to a candidate result CR. For example, words or sentences surrounding some or all occurrences of query terms or concepts may be extracted. The amount of text extracted influences a subsequent similarity measure. (Hence, tunable parameters 933 and 935 should be adjusted in concert.) In general, the less information extracted, the more similar the documents may be found to be (so the similarity threshold should be set higher), or stated oppositely, the more information extracted, the less similar the documents may be found to be (so the similarity threshold should be set lower).

Figure 11:
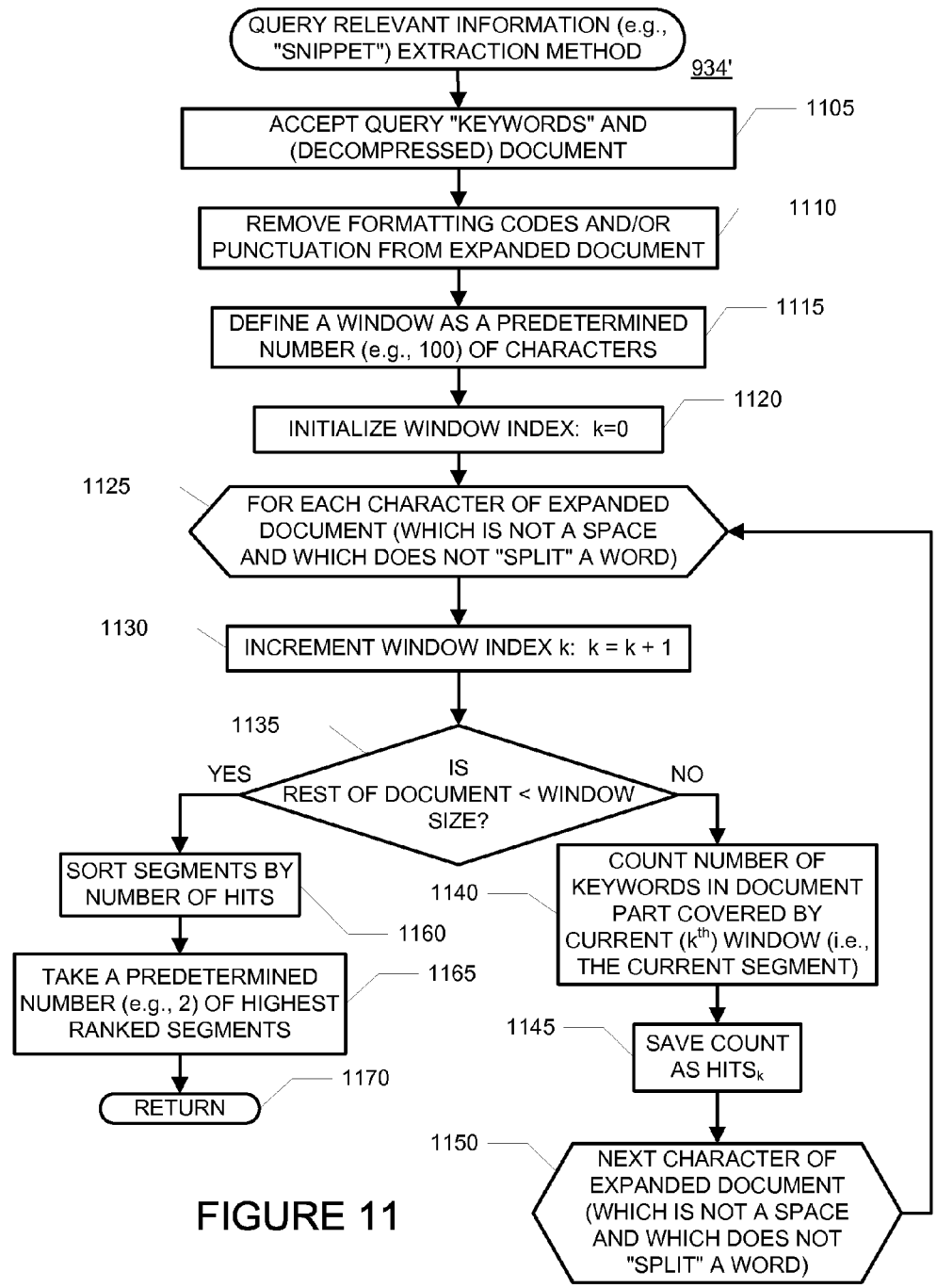
FIG. 11 is a high level flow diagram of an exemplary method that may be used to extract a query-relevant portion(s) (e.g., a "snippet(s)") of a document.

FIG. 11 is a high level flow diagram of an exemplary method 934' which may be used to extract query-relevant information (referred to as "segment(s)", which may be thought of as "candidate snippet(s)") from a document. This exemplary method 934' is similar to keyword-in-context summaries that show segments surrounding keyword occurrences. That is, the extraction method 934' chooses a number of segments (e.g., up to two) that show roughly 100 characters each from the candidate result document. Formatting information and most punctuation may be discarded.

Referring specifically to FIG. 11 now, the method 934' accepts query "keywords" and the (decompressed) document as shown in block 1105. The term "keywords" may include all words of the search, but preferably does not include so-called "stop words" which are so common that they do not convey much information or that convey some type of Boolean operation (e.g., "the", "it", "and", "or", "not", "that", etc.). As indicated by optional block 1110, formatting codes and/or at least some punctuation may be removed from the decompressed document. A window is defined as a predetermined number (e.g., 100) of characters as shown in block 1115. Alternatively, a window may be defined as a predetermined number (e.g., 15) of words.

In the following, the window is slid across (or a number of windows are applied over) the decompressed document. In this regard, a window index "k" is initialized as shown in block 1120. Then for each character of the decompressed document the following steps are performed as indicated by loop 1125-1150. In one embodiment, the steps within loop 1125-1150 may be performed for each character of the decompressed document that is not a space and that does not split a word (as characters that are not the first character of a word do). In the alternative where the window is a predetermined number of words, the steps within the loop 1125-1150 may be performed for each word of the decompressed document. In any event, the window index is incremented as indicated by block 1130. At decision branch point 1135, it is determined whether or not the rest of the decompressed document is less than the size of the window (that is, if the window extends beyond the last character (or word) of the decompressed document). If not, the number of keywords in the part of document covered by the current ($k^{th}$) window (i.e., the segment) is determined as shown in block 1140. This count is saved as a number of hits corresponding to the $k^{th}$ window (or $hits_k$) as shown in block 1145. The (next) window is then advanced as indicated by loop part 1150 and the method 934' branches back to loop part 1125.

Referring back to decision branch point 1135, if the size of the rest of the document is less than the size of the window, the method 934' branches to block 1160 where segments (as defined by the windows) are sorted by the number of hits. Then a predetermined number (e.g., two) of the highest ranking segments (as defined by the windows having the most hits—containing the most keywords) are returned as indicated by block 1165 before the method 934' is left via RETURN node 1170. These predetermined number of the highest ranking segments define the query-relevant part(s) of the document. Although not shown, the title of the document, if any, may be included in the query-relevant part(s) of the document.

An alternative query-relevant extraction method exploits the language structure of the document and selects sentences or paragraphs that contain a predetermined number (e.g., one) of the query's keywords. More specifically, the original document is segmented into sentences or paragraphs. Each sentence or paragraph is a "segment" (which may be thought of as a candidate snippet). Every segment that contains a predetermined number (e.g., one) of the keywords is included in the query-relevant part(s) $QR_i$ of the document.

Figure 12:
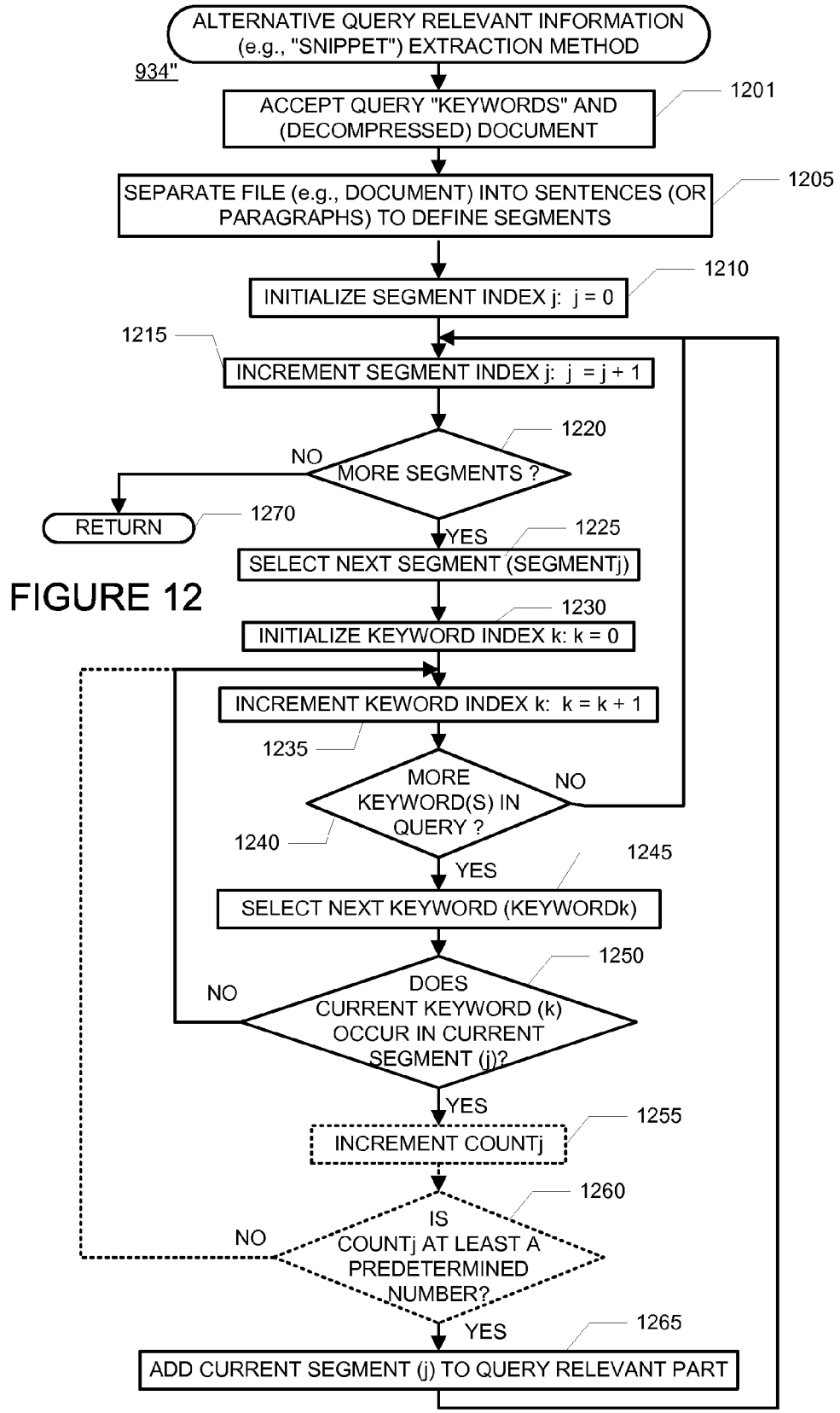
FIG. 12 is a high level flow diagram of another exemplary method that may be used to extract a query-relevant portion(s) (e.g., a "snippet(s)") of a document.

Referring specifically to FIG. 12 now, the method 934" accepts query "keywords" and the (decompressed) document as shown in block 1201. The document is then separated into sentences (or, alternatively, paragraphs) to define segments as indicated by block 1205. As shown in blocks 1210 and 1215, a segment index "j" is initialized and incremented. At decision branch point 1220, it is determined whether or not there are more segments. If not, the method 934" is left via RETURN node 1270. If, on the other hand, there are more segments, the next ($j^{th}$) segment is selected. As indicated by blocks 1230 and 1235, keyword index "k" is initialized and incremented. At decision branch point 1240, it is determined whether any more keywords are present in the query. If not, the method 934" branches back to block 1215 so that further segments, if any, may be processed. If, on the other hand, there are more keywords present in the query, the next ($k^{th}$) keyword is selected as shown in block 1245. Next, at decision branch point 1250, it is determined whether or not the current ($k^{th}$) keyword occurs in the current ($j^{th}$) segment. If so, the current ($j^{th}$) segment is added to the query-relevant part(s) (QR) as indicated by block 1265 and the method 934" branches back to step 1215 so that the next segment, if any, can be processed. If, on the other hand, the current keyword does not occur in the current segment, the method 934" branches back to block 1235 so that the next keyword, if any, can be checked.

In the foregoing description of method 934", a segment was added to the query-relevant part QR even if it contained only one occurrence of only one of the keywords. Alternatively, the segment may be added to the query-relevant part QR only if it contains at least a predetermined number of occurrences of any of the keywords (or, alternatively, only if it contains at least a predetermined number of different keywords). This second alternative is indicated by the portions of FIG. 12 illustrated in phantom lines. More specifically, if a current keyword occurs in a current segment, a count corresponding to the current segment is incremented as indicated in block 1255 and the current segment is added to the query-relevant part only if its count is at least a predetermined number as indicated by decision branch point 1260. If, in block 1255, the count associated with the segment were incremented by the number of times the current keyword appeared in the current segment, the first alternative would be effected.

In other alternative query-relevant information extraction methods, natural language processing techniques may be used to apply a syntactic analysis. (See, e.g., the article, S. Feldman, "NLP Meets the Jabberwocky: Natural Language Processing in Information Retrieval," *Online* (May 1999).) For example, a segment may be extracted by determining those sentences in the document that relate to query terms. Thus, rather than simply looking for keyword occurrences, the sentences or paragraphs that have meanings similar to those of the query may be sought. Thus, such techniques can be used to determine whether or not a segment of a candidate query result document is related, to at least a predetermined degree, to the query.

In most of the foregoing exemplary methods, all segments that are related to the query, at least to a predetermined degree, are extracted. Naturally, the segments could be rank ordered, based on the degree to which they are related to the query or some other ranking criteria, and only a predetermined number of the highest ranking segments would be added to the query-relevant part QR.

Having described a number of exemplary query-relevant information (e.g., snippet) extraction methods, exemplary query-relevant information (e.g., snippet) similarity determination methods are described in §4.3.1.1.2 below.

§4.3.1.1.2 Exemplary Query-Relevant Information (Snippet) Similarity Determination Method(s)

In the simplest case, similarity may be determined to exist only if the query-relevant part(s) QR of the two documents under consideration are equal.

Alternatively, edit distance can be used to determine whether or not query-relevant part(s) QR of the two documents under consideration are similar, rather than an equality measure.

In another alternative, the cosine distance between feature vectors (i.e., a vector in which each word in a lexicon is a dimension and the number of word occurrences is a magnitude of the dimension) of the query-relevant parts can be determined and a threshold (Recall tunable parameter 933.) can be applied. More specifically, a vector $\vec{QR}$ is determined for each query-relevant part(s) QR for documents corresponding to each of the candidate results CR. The vector $\vec{QR}$ comprises the word frequencies of the query-relevant part(s). For each word that appears in the query-relevant part(s), the corresponding entry in the vector $\vec{QR}$ is incremented. After the vector is generated, the vector is normalized. To determine the similarity of two query-relevant part(s) $QR_i$ and $QR_j$, the dot product, $\overrightarrow{QR_i} \cdot \overrightarrow{QR_j}$ is determined. The closer the result is to one (Cosine (0)=1), the more similar the two query-relevant parts QR are. This dot product is then compared with a threshold (Recall, e.g., tunable parameter 933.) to determine whether (the query-relevant part(s) of) the documents are similar or not. One disadvantage of this classic information retrieval (IR) approach is that two files with the same words in different orders would appear to be identical.

In yet another alternative embodiment, the Broder method, introduced in §1.2.2.1 above, may be used to determine similarity. More specifically, a "shingle" is a contiguous sequence in a document. The "w-shingling" of a document is defined as the set of all shingles of the size "w". The similarity or resemblance of two documents (or query-relevant parts) is based on the magnitude of their intersection divided by the magnitude of their union. Again, the closer the result is to one, the more similar the documents are. This ratio is then compared with a threshold (Recall, e.g., tunable parameter 933.) to determine whether (the query-relevant part(s) of) the documents are similar or not.

As can be appreciated from the foregoing description, the present invention is more concerned with what is being compared (i.e., query-relevant part(s)) for similarity than how the similarity determination is made. Accordingly, any known, publicly available, and/or proprietary similarity determination method can be used, although some may yield better results than others.

§4.3.2 Exemplary Apparatus

Figure 13:
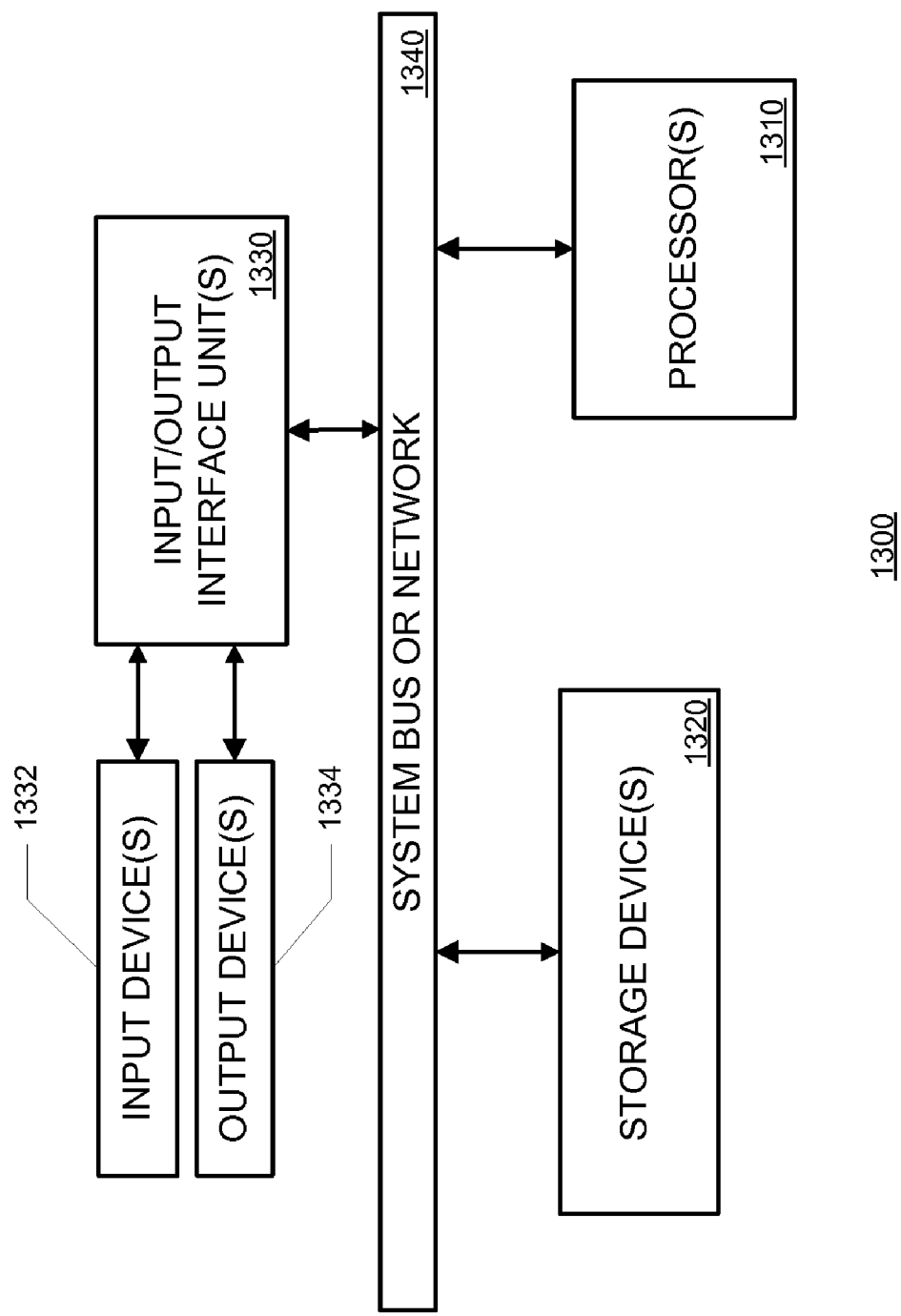
FIG. 13 is a high-level block diagram of a machine that may be used to effect one or more functions of the present invention.

FIG. 13 is high-level block diagram of a machine 1300 which may effect one or more of the processes discussed above. The machine 1300 basically includes a processor(s) 1310, an input/output interface unit(s) 1330, a storage device(s) 1320, and a system bus or network 1340 for facilitating the communication of information among the coupled elements. An input device(s) 1332 and an output device(s) 1334 may be coupled with the input/output interface(s) 1330.

The processor(s) 1310 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the storage device(s) 1320 and/or may be received from an external source via an input interface unit 1330.

Some aspects of the present invention may be effected in the general context of computer-executable instructions, such as program modules, being executed by a personal computer. However, the methods of the present invention may be effected by (and the data structures of the present invention may be stored on) other apparatus. Program modules may include routines, programs, objects, components, data structures, etc. that perform a task(s) or implement particular abstract data types. Moreover, those skilled in the art will appreciate that at least some aspects of the present invention may be practiced with other configurations, including handheld devices, multiprocessor systems, microprocessor-based or programmable consumer electronics, network computers, minicomputers, set-top boxes, mainframe computers, and the like. At least some aspects of the present invention may also be practiced in distributed computing environments where tasks are performed by remote processing devices linked through a communications network. In a distributed computing environment, program modules may be located in local and/or remote memory storage devices.

In one embodiment, the machine 1300 may be one or more conventional personal computers. In this case, the processing unit(s) 1310 may be one or more microprocessors, the bus 1340 may include a system bus that couples various system components including a system memory to the processing unit(s). The system bus 1340 may be any of several types of bus structures including a memory bus or memory controller, a peripheral bus, and a local bus using any of a variety of bus architectures. The storage devices 1320 may include system memory, such as read only memory (ROM) and/or random access memory (RAM). A basic input/output system (BIOS), containing basic routines that help to transfer information between elements within the personal computer, such as during start-up, may be stored in ROM. The storage device(s) 1320 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media. The hard disk drive, magnetic disk drive, and (magneto-) optical disk drive may be coupled with the system bus 1340 by a hard disk drive interface, a magnetic disk drive interface, and an (magneto-) optical drive interface, respectively. The drives and their associated storage media may provide nonvolatile storage of machine-readable instructions, data structures, program modules and other data for the personal computer. Although the exemplary environment described herein employs a hard disk, a removable magnetic disk and a removable optical disk, those skilled in the art will appreciate that other types of storage media (with appropriate interface devices), may be used instead of, or in addition to, the storage devices introduced above.

A user may enter commands and information into the personal computer through input devices 1332, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1310 through a serial port interface 1330 coupled to the system bus 1340. Input devices may be connected by other interfaces 1330, such as a parallel port, a game port or a universal serial bus (USB). However, in the context of a search facility 730, no input devices, other than those needed to accept queries, and possibly those for system administration and maintenance, are needed.

The output device(s) 1334 may include a monitor or other type of display device, which may also be connected to the system bus 1340 via an interface 1330, such as a video adapter for example. In addition to (or instead of) the monitor, the personal computer may include other (peripheral) output devices (not shown), such as speakers and printers for example. Again, in the context of a search facility 730, no output devices, other than those needed to communicate query results, and possibly those for system administration and maintenance, are needed.

The computer may operate in a networked environment which defines logical and/or physical connections to one or more remote computers, such as a remote computer. The remote computer may be another personal computer, a server, a router, a network computer, a peer device or other common network node, and may include many or all of the elements described above relative to the personal computer. The logical and/or physical connections may include a local area network (LAN) and a wide area network (WAN). An intranet and the Internet may be used instead of, or in addition to, such networks.

When used in a LAN, the personal computer may be connected to the LAN through a network interface adapter (or "NIC") 1330. When used in a WAN, such as the Internet, the personal computer may include a modem or other means for establishing communications over the wide area network. In a networked environment, at least some of the program modules depicted relative to the personal computer may be stored in the remote memory storage device. The network connections shown are exemplary and other means of establishing a communications link between the computers may be used.

Referring once again to FIG. 7, the information access facility 710 may be a personal computer, the browsing process 712 may be an Internet browser such as Explorer from Microsoft Corporation or Netscape from Sun Microsystems, and the input/output interface process(es) 718 may include communications software and hardware. Other information access facilities 710 may be untethered devices such as mobile telephones, personal digital assistants, etc., or other information appliances such as set-top boxes, network appliances, etc.

§4.4 Example of Operation of Exemplary Embodiment

Figure 14:
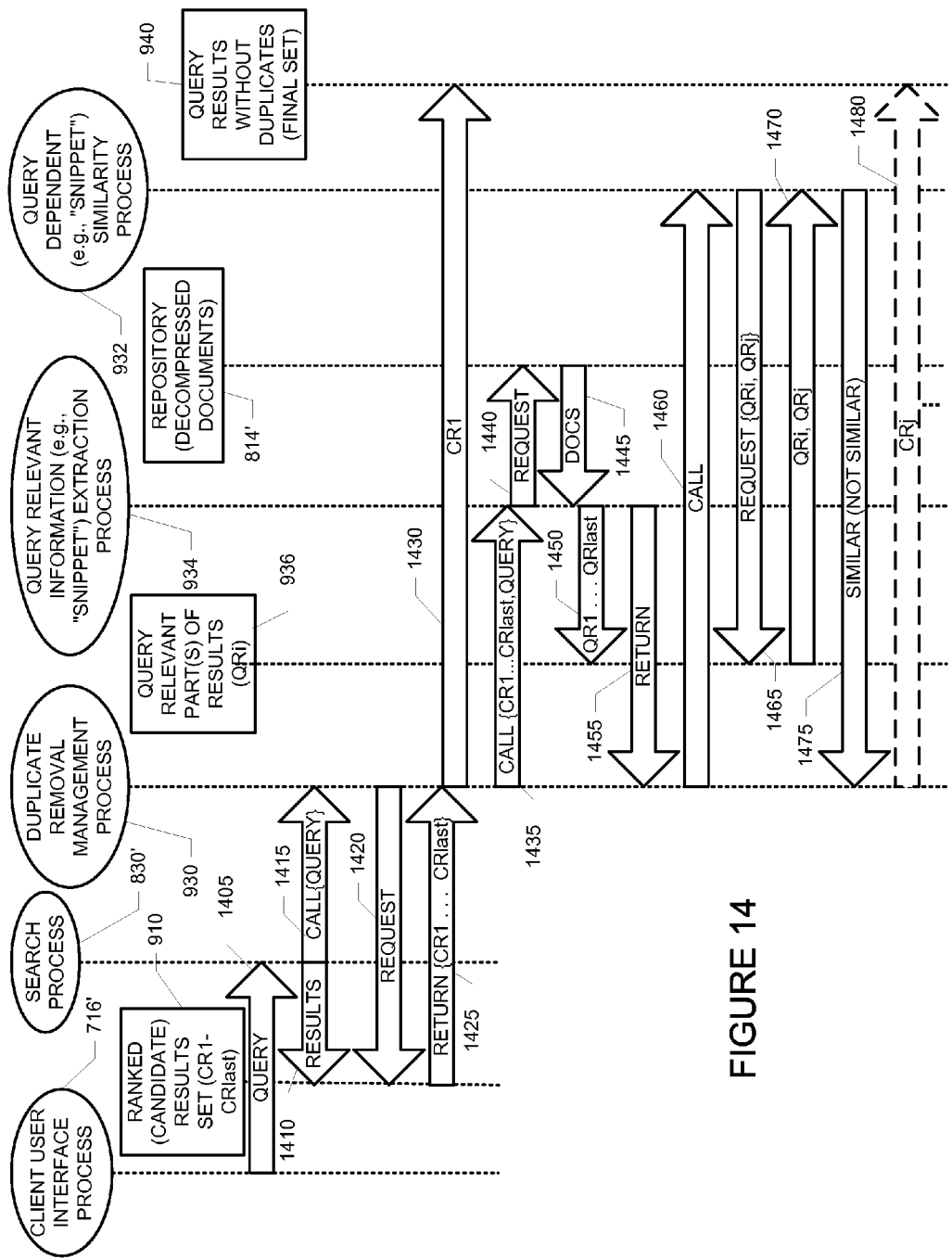
FIG. 14 is a data messaging diagram that illustrates an example of operations that may be performed by an exemplary embodiment of the present invention.
Figure 15:
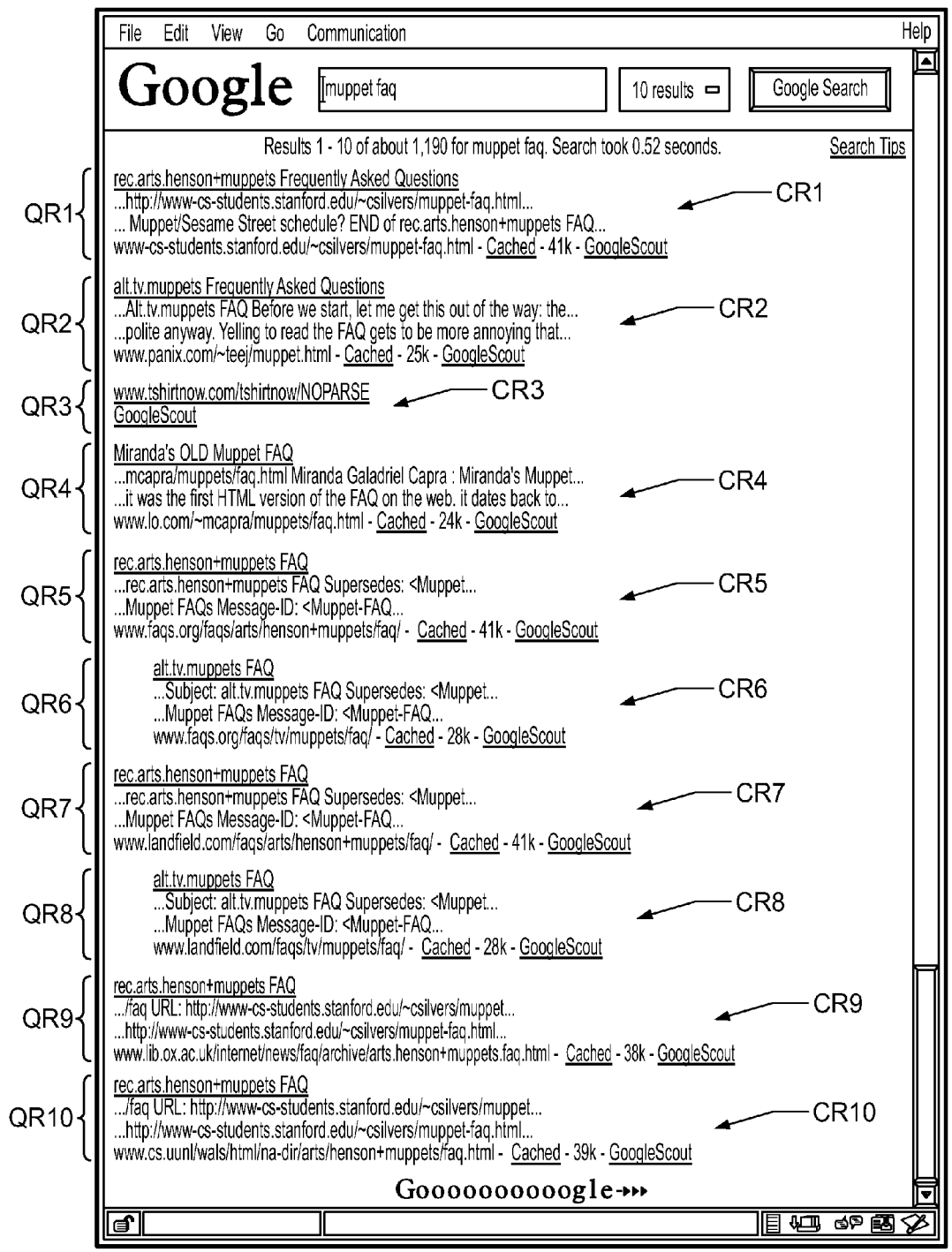
FIG. 15 illustrates an example of query-relevant parts of candidate results.

An example of operation of an exemplary embodiment of the present invention is now described with reference to FIGS. 14 through 16. FIG. 14 is a data messaging or communications diagram which illustrates an operation of an exemplary embodiment of the present invention. First, as indicated by communication 1405, a search process 830' receives a query from a client user interface process 716'. In this example, the query is "muppet faq". (Referring to FIG. 7, the (entire) browsing process 712, the (client) input/output interface process(es) 718, the network 760, the (search engine) input/output interface process(es) 732, and the (entire) query processing process 734 are not shown in FIG. 14, to simplify the drawing.) The search process 830' generates results in the normal manner and saves them as rank-ordered results, as indicated by communication 1410. FIG. 15 illustrates these results as they could be rendered to the client user. In accordance with the present invention, however, these ranked results are merely candidate results $CR_1, CR_2, \ldots, CR_{10}$. The search process 830' then calls the duplicate removal management process 930 as indicated by communication 1415.

The duplicate removal management process 930 will then request at least some, if not all, of the candidate results as indicated in communication 1420. The requested results are returned in communication 1425. Since the first candidate result $CR_1$ is the highest ranking, if its query-relevant parts $QR_1$ are "similar" to the query-relevant parts $QR_i$ ($i \neq 1$), it is still kept as a final result—the $i^{th}$ candidate result $CR_i$ is not used. Accordingly, as indicated by communication 1430, the duplicate removal management process 930 may write the first candidate results $CR_i$ to the final set 940.

The duplicate removal management process 930 also calls the query-relevant information (e.g., "snippet") extraction process 934 as indicated by communication 1435. In response, the query-relevant information extraction process 934 requests 1440 the (decompressed) documents corresponding to the candidate results CR as indicated by communication 1440. The repository 814', or some other source of (decompressed) documents, returns the requested (decompressed) documents to the query-relevant information extraction process 934 as indicated by communication 1445. The query-relevant information extraction process 934 may determine the query-relevant parts QR of the decompressed documents and save them to 936 as indicated by communication 1450. The query-relevant information extraction process 934 then indicates to the duplicate management process 930 that it is done, as indicated by communication 1455. (Note that although the query-relevant information extraction process 934 has been illustrated as operating on all of the candidate results CR, it can process smaller batches of candidate results CR, or process one candidate result CR at a time.)

The duplicate removal management process 930 may then call the query dependent similarity process 932 as indicated by communication 1460. In response, the query dependent similarity process 932 may request at least two query-relevant part(s) QR of at least two candidate results for comparison as indicated by communication 1465. These query-relevant part(s) QRs are returned to the query dependent similarity process 932 in communication 1470. Once the query dependent similarity process 932 determines whether or not the two query-relevant part(s) QRs are similar or not, it returns its answer to the duplicate management process 930 as indicated by communication 1475. The communications 1465, 1470, and 1475 may be repeated for each candidate result in the final set (until a similarity is determined). If a "not similar" response is returned for all pairs of the $i^{th}$ query part(s) and query part(s) QR corresponding to candidate results CR already in the final set, the candidate result CR corresponding to the query-relevant part(s) under consideration is written to the final set 940 as indicated by communication 1480. Once, however, a "similar" response is returned, the candidate CR under consideration is removed from consideration.

In the example illustrated in FIG. 15, an extraction method which extracts titles (See the first line, underlined, of each candidate result CR.) and two snippets (See the second and third lines of each candidate result CR.), and a similarity method which requires an exact match of query-relevant part(s) were used.

Referring to FIG. 15, since the query-relevant part(s) $QR_7$ of candidate results $CR_7$ exactly match the query-relevant parts $QR_5$ of candidate result $CR_5$, the candidate result $CR_7$ will not be part of the final set 940. In this particular example, the candidate results $CR_5$ and $CR_7$ had identical content but different "last update" dates and different "BASE HREF" tags reflecting that they are hosted at different locations. Similarly, since the query-relevant part(s) $QR_8$ of candidate results $CR_8$ exactly match the query-relevant parts $QR_6$ of candidate result $CR_6$, the candidate result $CR_8$ will not be part of the final set 940.

Still referring to FIG. 15, candidate results $CR_9$ and $CR_{10}$ also reference the same document as candidate results $CR_5$ and $CR_7$. The documents corresponding to $CR_9$ and $CR_{10}$ contain the same information as those corresponding to $CR_5$ and $CR_7$ except for headers added by the hosting sites. Only one of these two results is saved to the final set 930 ($CR_9$ is saved rather than $CR_{10}$ since it is slightly more relevant.) to be rendered to the client user.

Figure 16:
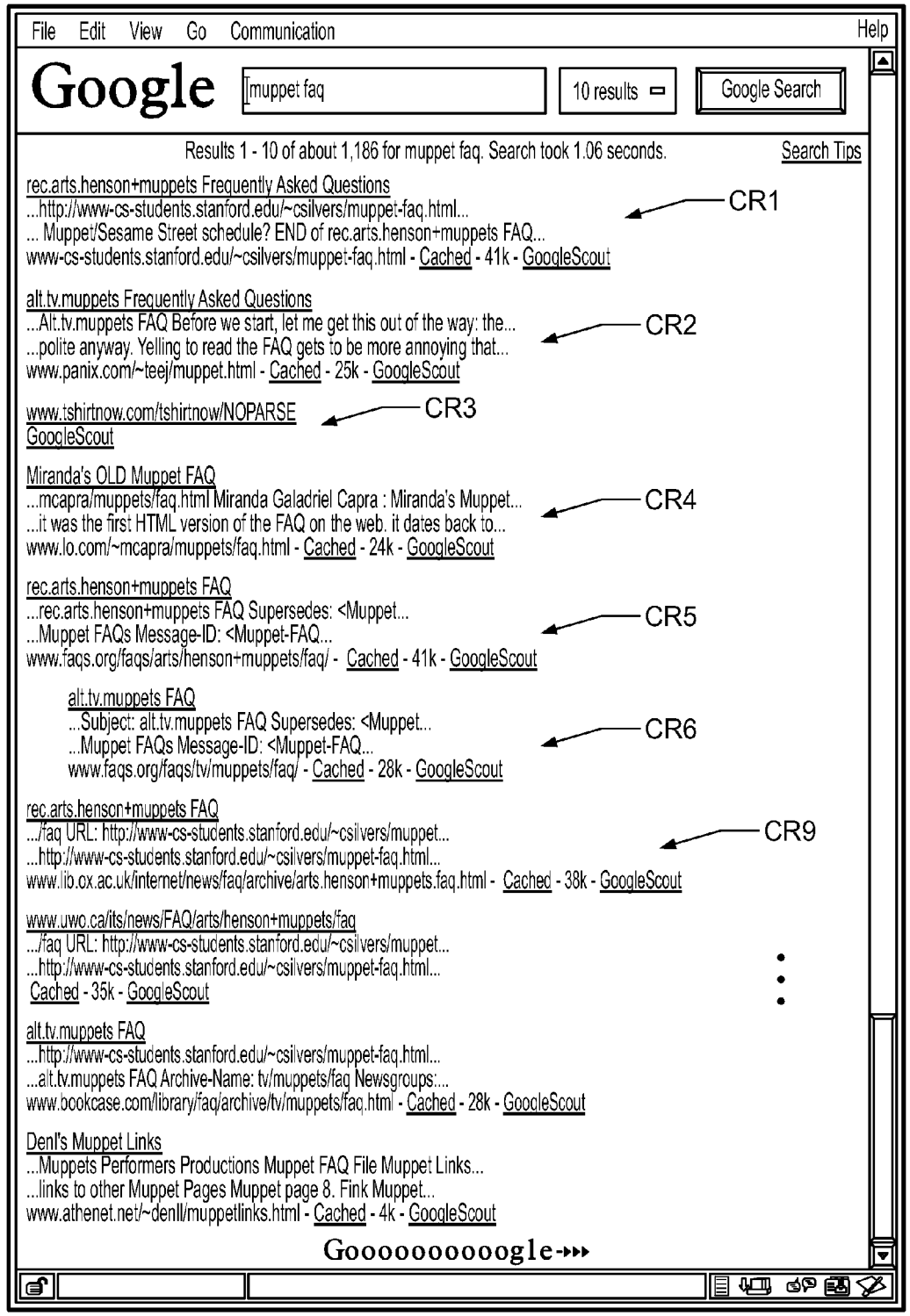
FIG. 16 illustrates updated results after query-relevant duplicates have been removed.

FIG. 16 illustrates the results as they could be rendered to the client user. Notice that candidate results $CR_7$, $CR_8$, and $CR_{10}$ did not make the final set. The last three results are other candidate results which ranked lower than $CR_{10}$.

In the foregoing example, the snippets rendered to a client user (preceding a URL also rendered to the client user) were the same as those snippets extracted by the query-relevant information (e.g., snippet) extraction process 934.

Slightly modifying the foregoing example, if the query-relevant information extraction method were changed so that only document titles, if they exist, were extracted, a much more aggressive duplicate removal method would result. If this method was used with the candidate results $CR_1$ through $CR_{10}$ of FIG. 15, candidate results $CR_7$, $CR_9$, and $CR_{10}$ would not make the final set 940 since they have the same title as candidate result $CR_5$. Similarly, candidate result $CR_8$ would not make the final set 940 since it has the same title as candidate results $CR_6$.

In another example, if the query-relevant information extraction method were maintained (i.e., title and two snippets), but the similarity method were relaxed such that query-relevant part(s) QRs with no more than five non-intersecting words were deemed similar, then candidate results $CR_6$, $CR_7$, and $CR_8$ would be found to be duplicates of candidate result $CR_5$, and candidate result $CR_{10}$ would be found to be a duplicate of candidate result $CR_9$.

§4.5 Conclusions

As can be appreciated from the foregoing, an improved duplicate detection technique is disclosed. This technique may be automated so that processing a large amount of content from a large number of sources is feasible. By limiting the portion(s) of the documents being compared based on a query, a large range of duplicate document types, including those that would be missed by conventional similarity determination techniques, may now be detected. Further, since only a portion(s) of the documents are compared, the similarity threshold can be set relatively higher, thereby decreasing the number of documents that would be falsely identified as duplicates if a lower threshold were used.

What is claimed is:

1. A computer-implemented method, comprising:
   receiving a plurality of search results responsive to a query, wherein the query includes one or more search keywords, and wherein the plurality of search results have an associated order, where the particular order is determined using a ranking criteria;
   processing each search result in the plurality of search results according to the order for the plurality of search results to generate a final group of search results, the final group of search results including a plurality of final search results from the plurality of search results, the processing including,
      adding a first search result in the plurality of search results to the final group of search results, wherein the first search result is first in the order for the plurality of search results, and
      for each other search result of the plurality of search results:
         determining whether a first document corresponding to the search result is a query-specific duplicate of a second document corresponding to any of the search results in the final group of search results, and
         if the first document corresponding to the search result is not a query-specific duplicate of the second document corresponding to any of the remaining search results in the final group of search results, adding the search result to the final set of search results before processing any other search result following the search result in the order, and otherwise not adding the search result to the final set of search results; and
   providing the final group of search results.

2. The method of claim 1, wherein determining whether the first document is the query-specific duplicate of the second document further comprises comparing one or more first query-relevant parts of the first document and one or more second query-relevant parts of the second document, where each first query-relevant part and each second query-relevant part includes at least one of the one or more keywords.

3. The method of claim 2, wherein determining whether the first document is the query-specific duplicate of the second document further comprises determining whether the one or more first query-relevant parts are identical to the one or more second query-relevant parts.

4. The method of claim 2, wherein determining whether the first document is the query-specific duplicate of a second document further comprises determining whether the one or more first query-relevant parts are similar to the one or more second query-relevant parts.

5. The method of claim 4, further comprising determining whether the one or more first query-relevant parts are similar to the one or more second query relevant-parts according to one or more of an edit distance between the one or more first query-relevant parts and the one or more second query-relevant parts, a cosine distance between a feature vector for the one or more first query-relevant parts and a feature vector for the one or more second query-relevant parts, or an analysis of shingles in the one or more first query-relevant parts and shingles in the one or more second query-relevant parts.

6. The method of claim 2, wherein determining whether the first document is the query-specific duplicate of the second document further comprises extracting one or more query-relevant parts from the first document and extracting one or more query-relevant parts from the second document.

7. The method of claim 2, wherein the one or more first query-relevant parts are a limited portion of the first document and the one or more second query-relevant parts are a limited portion of the second document.

8. The method of claim 1, wherein determining whether the first document corresponding to the search result is the query-specific duplicate of the second document corresponding to any of the search results in the final group of search results further comprises comparing query-relevant parts of the first document to query-relevant parts of a respective document corresponding to each search result in the final set of search results.

9. The method of claim 1, wherein the order of the plurality of search results is based on a degree of match, for each search result, between the search keywords and words in a document corresponding to the search result.

10. The method of claim 9, wherein the order of the plurality of search results is further based on an estimate of a quality of each search result.

11. A system, comprising:
    one or more computers configured to perform operations comprising:
       receiving a plurality of search results responsive to a query, wherein the query includes one or more search keywords, and wherein the plurality of search results have an associated order, where the particular order is determined using a ranking criteria;
       processing each search result in the plurality of search results according to the order for the plurality of search results to generate a final group of search results, the final group of search results including a plurality of final search results from the plurality of search results, the processing including,
          adding a first search result in the plurality of search results to the final group of search results, wherein the first search result is first in the order for the plurality of search results, and
          for each other search result of the plurality of search results:
             determining whether a first document corresponding to the search result is a query-specific duplicate of a second document corresponding to any of the search results in the final group of search results, and if the first document corresponding to the search result is not a query-specific duplicate of the second document corresponding to any of the remaining search results in the final group of search results, adding the search result to the final set of search results before processing any other search result following the search result in the order, and otherwise not adding the search result to the final set of search results; and providing the final group of search results.

12. The system of claim 11, wherein determining whether the first document is the query-specific duplicate of the second document further comprises comparing one or more first query-relevant parts of the first document and one or more second query-relevant parts of the second document, where each first query-relevant part and each second query-relevant part includes at least one of the one or more keywords.

13. The system of claim 12, wherein determining whether the first document is the query-specific duplicate of the second document further comprises determining whether the one or more first query-relevant parts are identical to the one or more second query-relevant parts.

14. The system of claim 12, wherein determining whether the first document is the query-specific duplicate of a second document further comprises determining whether the one or more first query-relevant parts are similar to the one or more second query-relevant parts.

15. The system of claim 14, wherein the operations further comprise determining whether the one or more first query-relevant parts are similar to the one or more second query relevant-parts according to one or more of an edit distance between the one or more first query-relevant parts and the one or more second query-relevant parts, a cosine distance between a feature vector for the one or more first query-relevant parts and a feature vector for the one or more second query-relevant parts, or an analysis of shingles in the one or more first query-relevant parts and shingles in the one or more second query-relevant parts.

16. The system of claim 12, wherein determining whether the first document is the query-specific duplicate of the second document further comprises extracting one or more query-relevant parts from the first document and extracting one or more query-relevant parts from the second document.

17. The system of claim 12, wherein the one or more first query-relevant parts are a limited portion of the first document and the one or more second query-relevant parts are a limited portion of the second document.

18. The system of claim 11, wherein determining whether the first document corresponding to the search result is the query-specific duplicate of the second document corresponding to any of the search results in the final group of search results further comprises comparing query-relevant parts of the first document to query-relevant parts of a respective document corresponding to each search result in the final set of search results.

19. The system of claim 11, wherein the order of the plurality of search results is based on a degree of match, for each search result, between the search keywords and words in a document corresponding to the search result.

20. The system of claim 19, wherein the order of the plurality of search results is further based on an estimate of a quality of each search result.

21. A computer storage medium encoded with a computer program, the program comprising instructions that when executed by data processing apparatus cause the data processing apparatus to perform operations comprising:

receiving a plurality of search results responsive to a query, wherein the query includes one or more search keywords, and wherein the plurality of search results have an associated order, where the particular order is determined using a ranking criteria;

processing each search result in the plurality of search results according to the order for the plurality of search results to generate a final group of search results, the final group of search results including a plurality of final search results from the plurality of search results, the processing including, adding a first search result in the plurality of search results to the final group of search results, wherein the first search result is first in the order for the plurality of search results, and for each other search result of the plurality of search results:

determining whether a first document corresponding to the search result is a query-specific duplicate of a second document corresponding to any of the search results in the final group of search results, and if the first document corresponding to the search result is not a query-specific duplicate of the second document corresponding to any of the remaining search results in the final group of search results, adding the search result to the final set of search results before processing any other search result following the search result in the order, and otherwise not adding the search result to the final set of search results; and providing the final group of search results.

22. A computer storage medium encoded with a computer program, the program comprising instructions that when executed by data processing apparatus cause the data processing apparatus to perform operations comprising:

receiving search results in response to a query, the query including one or more keywords, the search results including a first search result and a second search result;

generating a set of final search results from the received search results with one or more processors, including:

adding the first search result to the set of final search results;

determining that a first document corresponding to the first search result and a second document corresponding to the second search result are query-specific duplicate documents from a comparison of one or more first query-relevant parts of the first document and one or more second query-relevant parts of the second document, where each query-relevant part includes at least one of the one or more keywords; and in response to the determination, not adding the second search result to the set of final search results; and providing the set of final search results.

23. The computer storage medium of claim 22, wherein:

the received search results further include a third search result; and generating the set of final search results further includes:

determining that the first document and a third document corresponding to the third search result are not query-specific duplicate documents based on a comparison of the one or more first query-relevant parts of the first document and one or more third query-relevant parts of the third document; and in response to the determination, adding the third search result to the set of final search results.

24. The computer storage medium of claim 22, wherein the set of final search results includes web pages.

25. The computer storage medium of claim 22, wherein the receiving search results and generating a set of final search results are performed automatically, without the need for user intervention.

26. The computer storage medium of claim 22, wherein the query-relevant parts include a predetermined number of characters.

27. The computer storage medium of claim 22, wherein the query-relevant parts include a predetermined number of words.

28. The computer storage medium of claim 22, wherein the query-relevant parts are sentences.

29. The computer storage medium of claim 22, wherein the query-relevant parts are paragraphs.

30. The computer storage medium of claim 22, wherein determining whether the first document is the query-specific duplicate of the second document further comprises comparing one or more first query-relevant parts of the first document and one or more second query-relevant parts of the second document, where each first query-relevant part and each second query-relevant part includes at least one of the one or more keywords.

31. The computer storage medium of claim 30, wherein determining whether the first document is the query-specific duplicate of the second document further comprises determining whether the one or more first query-relevant parts are identical to the one or more second query-relevant parts.

32. The computer storage medium of claim 30, wherein determining whether the first document is the query-specific duplicate of the second document further comprises determining whether the one or more first query-relevant parts are similar to the one or more second query-relevant parts.

33. The computer storage medium of claim 32, wherein the operations further comprise determining whether the one or more first query-relevant parts are similar to the one or more second query relevant-parts according to one or more of an edit distance between the one or more first query-relevant parts and the one or more second query-relevant parts, a cosine distance between a feature vector for the one or more first query-relevant parts and a feature vector for the one or more second query-relevant parts, or an analysis of shingles in the one or more first query-relevant parts and shingles in the one or more second query-relevant parts.

34. The computer storage medium of claim 30, wherein determining whether the first document is the query-specific duplicate of the second document further comprises extracting one or more query-relevant parts from the first document and extracting one or more query-relevant parts from the second document.

35. The computer storage medium of claim 30, wherein the one or more first query-relevant parts are a limited portion of the first document and the one or more second query-relevant parts are a limited portion of the second document.

36. The computer storage medium of claim 21, wherein determining whether the first document corresponding to the search result is the query-specific duplicate of the second document corresponding to any of the search results in the final group of search results further comprises comparing query-relevant parts of the first document to query-relevant parts of a respective document corresponding to each search result in the final set of search results.

37. The computer storage medium of claim 21, wherein the order of the plurality of search results is based on a degree of match, for each search result, between the search keywords and words in a document corresponding to the search result.

38. The computer storage medium of claim 37, wherein the order of the plurality of search results is further based on an estimate of a quality of each search result.

39. The method of claim 1, wherein the ranking criteria is based at least in part on content associated with the respective search results.

40. The system of claim 11, wherein the ranking criteria is based at least in part on content associated with the respective search results.

41. The computer storage medium of claim 21, wherein the ranking criteria is based at least in part on content associated with the respective search results.

* * * * *

UNITED STATES PATENT AND TRADEMARK OFFICE
CERTIFICATE OF CORRECTION

| | | |
|---|---|---|
| PATENT NO. | : 8,214,359 B1 | |
| APPLICATION NO. | : 12/839164 | |
| DATED | : July 3, 2012 | |
| INVENTOR(S) | : Benedict A. Gomes and Benjamin T. Smith | |

It is certified that error appears in the above-identified patent and that said Letters Patent is hereby corrected as shown below:

In the Claims:

On Col. 18, line 13 (Claim 5), delete "query relevant-parts" and insert -- query-relevant parts --, therefor.

On Col. 19, lines 33-34 (Claim 15), delete "query relevant-parts" and insert -- query-relevant parts --, therefor.

On Col. 21, line 41 (Approx.) (Claim 33), delete "query relevant-parts" and insert -- query-relevant parts --, therefor.

Signed and Sealed this
Ninth Day of October, 2012

David J. Kappos
*Director of the United States Patent and Trademark Office*